US010859405B2

(12) United States Patent
Ohta et al.

(10) Patent No.: US 10,859,405 B2
(45) Date of Patent: Dec. 8, 2020

(54) SENSOR SYSTEM, SENSOR MODULE, AND METHOD OF MOUNTING SENSOR SYSTEM

(71) Applicant: TDK CORPORATION, Tokyo (JP)

(72) Inventors: Naoki Ohta, Tokyo (JP); Yoshiyuki Mizoguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 63 days.

(21) Appl. No.: 16/201,327

(22) Filed: Nov. 27, 2018

(65) Prior Publication Data

US 2019/0162559 A1 May 30, 2019

(30) Foreign Application Priority Data

Nov. 27, 2017 (JP) ................................ 2017-226929

(51) Int. Cl.
*G01R 33/00* (2006.01)
*G01D 5/16* (2006.01)
*G01D 5/14* (2006.01)

(52) U.S. Cl.
CPC ............... *G01D 5/16* (2013.01); *G01D 5/145* (2013.01)

(58) Field of Classification Search
CPC . G01D 5/145; G01D 3/02; G01B 7/30; G01R 33/093; G01R 33/098; G01R 33/07; G01R 33/09
See application file for complete search history.

(56) References Cited

U.S. PATENT DOCUMENTS 5,081,867 A * 1/1992 Yamada ................ G01P 15/123 73/514.33
5,973,906 A * 10/1999 Stevenson ............ A61N 1/3754 361/302
2008/0278158 A1* 11/2008 Granig .................. B82Y 25/00 324/247

FOREIGN PATENT DOCUMENTS

JP H03-104860 U 10/1991
JP 2002-156204 * 5/2002 ............... G01D 5/14
JP 2002-156204 A 5/2002
JP 2012-88182 A 5/2012
JP 2014-163876 A 9/2014

* cited by examiner

*Primary Examiner* — Alesa Allgood
(74) *Attorney, Agent, or Firm* — Oliff PLC

(57) ABSTRACT

A sensor system according to an embodiment of the disclosure includes a physical quantity distribution generation source configured to generate a distribution of a physical quantity, and a plurality of sensor packages including respective sensor chips configured to detect the physical quantity. In a plane including the sensor packages, central positions of the respective sensor chips are shifted in directions from central positions of the respective sensor packages toward a central position of the distribution of the physical quantity, and distances from the central position of the distribution of the physical quantity to the central positions of the respective sensor chips of the respective sensor packages are substantially equal to each other.

10 Claims, 6 Drawing Sheets

SENSOR SYSTEM, SENSOR MODULE, AND METHOD OF MOUNTING SENSOR SYSTEM

CROSS REFERENCE TO RELATED APPLICATIONS

This application claims the benefit of Japanese Priority Patent Application No. 2017-226929 filed on Nov. 27, 2017, the entire contents of which are incorporated herein by reference.

BACKGROUND

The disclosure relates to a sensor system and a sensor module that include a plurality of sensor packages each including a sensor chip, and to a method of mounting the sensor system.

In recent years, in association with automated driving of a vehicle, for example, consideration has been given, in a sensor system to be mounted on such a vehicle, to redundancy allowing for detection of failure as well as achievement of continuity of functions of the overall sensor system. For example, Japanese Unexamined Patent Application Publication No. 2012-88182 discloses a magnetic detector including two sensor elements. Further, Japanese Unexamined Patent Application Publication No. 2014-163876 discloses a rotation angle detector using two giant magnetoresistance effect (GMR) sensors.

SUMMARY

A sensor system according to one embodiment of the disclosure includes a physical quantity distribution generation source configured to generate a distribution of a physical quantity, and a plurality of sensor packages including respective sensor chips configured to detect the physical quantity. In a plane including the sensor packages, central positions of the respective sensor chips are shifted in directions from central positions of the respective sensor packages toward a central position of the distribution of the physical quantity, and distances from the central position of the distribution of the physical quantity to the central positions of the respective sensor chips of the respective sensor packages are substantially equal to each other.

A sensor system according to one embodiment of the disclosure includes a physical quantity distribution generation source configured to generate a distribution of a physical quantity, and a plurality of sensor packages including respective sensor chips configured to detect the physical quantity. In a plane including the sensor packages, a chip center-to-center distance between central positions of the respective sensor chips is shorter than a package center-to-center distance between central positions of the respective sensor packages, and distances from a central position of the distribution of the physical quantity to the central positions of the respective sensor chips are substantially equal to each other.

A sensor module according to one embodiment of the disclosure includes a first sensor package including a first sensor chip configured to detect a physical quantity, and a second sensor package including a second sensor chip configured to detect the physical quantity. In a plane including the first sensor package and the second sensor package, a central position of the first sensor chip is shifted in a direction from a central position of the first sensor package toward a central position of a distribution of the physical quantity, and a central position of the second sensor chip is shifted in a direction from a central position of the second sensor package toward the central position of the distribution of the physical quantity. Further, a distance from the central position of the distribution of the physical quantity to the central position of the first sensor chip and a distance from the central position of the distribution of the physical quantity to the central position of the second sensor chip are substantially equal to each other.

A sensor module according to one embodiment of the disclosure includes a first sensor package including a first sensor chip configured to detect a physical quantity, and a second sensor package including a second sensor chip configured to detect the physical quantity. In a plane including the first sensor package and the second sensor package, a chip center-to-center distance between a central position of the first sensor chip and a central position of the second sensor chip is shorter than a package center-to-center distance between a central position of the first sensor package and a central position of the second sensor package, and a distance from a central position of a distribution of the physical quantity to the central position of the first sensor chip and a distance from the central position of the distribution of the physical quantity to the central position of the second sensor chip are substantially equal to each other.

A method of mounting a sensor system according to one embodiment of the disclosure includes: preparing a physical quantity distribution generation source configured to generate a distribution of a physical quantity and a plurality of sensor packages including respective sensor chips configured to detect the physical quantity; and disposing the sensor packages with respect to the physical quantity distribution generation source. In a plane including the sensor packages, central positions of the respective sensor chips are shifted in directions from central positions of the respective sensor packages toward a central position of the distribution of the physical quantity, and distances from the central position of the distribution of the physical quantity to the central positions of the respective sensor chips of the respective sensor packages are set substantially equal to each other.

A method of mounting a sensor system according to one embodiment of the disclosure includes: preparing a physical quantity distribution generation source configured to generate a distribution of a physical quantity and a plurality of sensor packages including respective sensor chips configured to detect the physical quantity; and disposing the sensor packages with respect to the physical quantity distribution generation source. In a plane including the sensor packages, a chip center-to-center distance between central positions of the respective sensor chips is set shorter than a package center-to-center distance between central positions of the respective sensor packages, and distances from the central position of the distribution of the physical quantity to the central positions of the respective sensor chips are set substantially equal to each other.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1A:
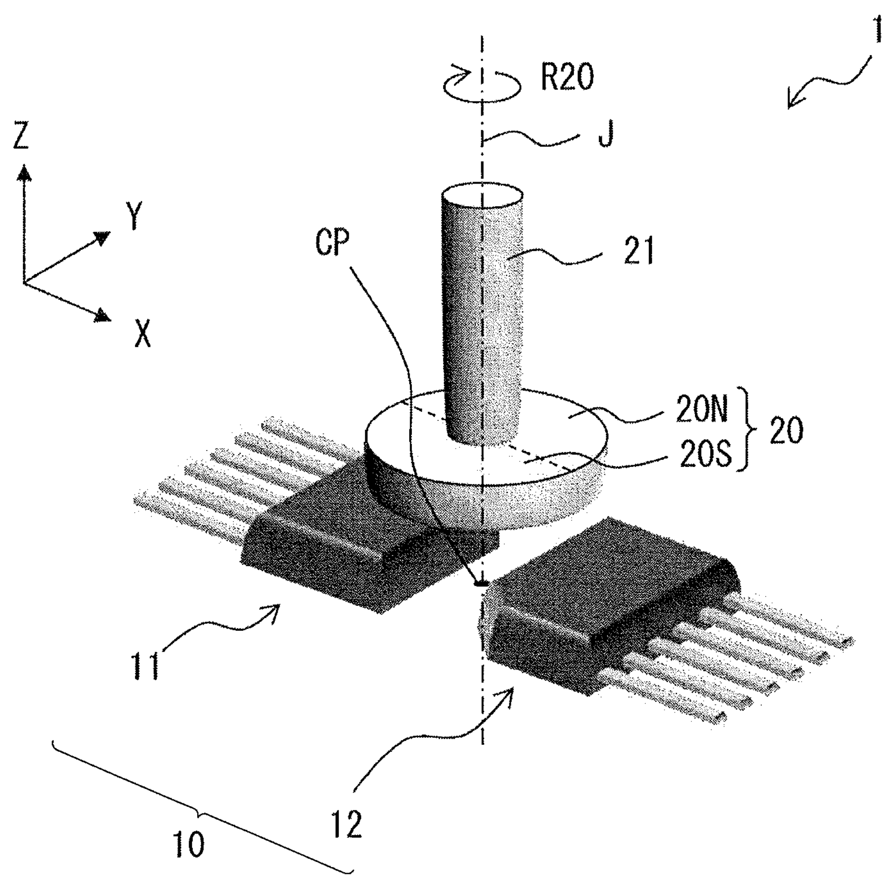
FIG. 1A is a perspective view of an outline configuration example of an appearance of a sensor system according to one embodiment of the disclosure.

Some embodiments of the disclosure are described below in detail with reference to the accompanying drawings.

A sensor module or a sensor system designed to achieve redundancy has also recently been requested to have enhanced detection accuracy as well as smaller size.

It is desirable to provide a sensor system and a sensor module that exhibit more superior detection accuracy despite small size, as well as a method of mounting such a sensor system.

It is to be noted that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. It is to be noted that the like elements are denoted with the same reference numerals, and any redundant description thereof will not be described in detail. It is to be noted that the description is given in the following order.

1. Example Embodiment (An example of a sensor system including two sensor packages in which respective sensor chips are embedded.)
    1.1 Overall Configuration of Sensor System
    1.2 Method of Mounting Sensor System
    1.3 Workings and Example Effects of Sensor System
2. Modification Examples (First to Third Modification Examples)
    2.1 First Modification Example (An example of a sensor system in which three sensor packages are disposed in the same plane.)
    2.2 Second Modification Example (An example of another sensor system in which three sensor packages are disposed in the same plane.)
    2.3 Third Modification Example (An example of a sensor system in which four sensor packages are disposed in the same plane.)

1. Example Embodiment

1.1 Overall Configuration of Sensor System 1

Figure 1B:
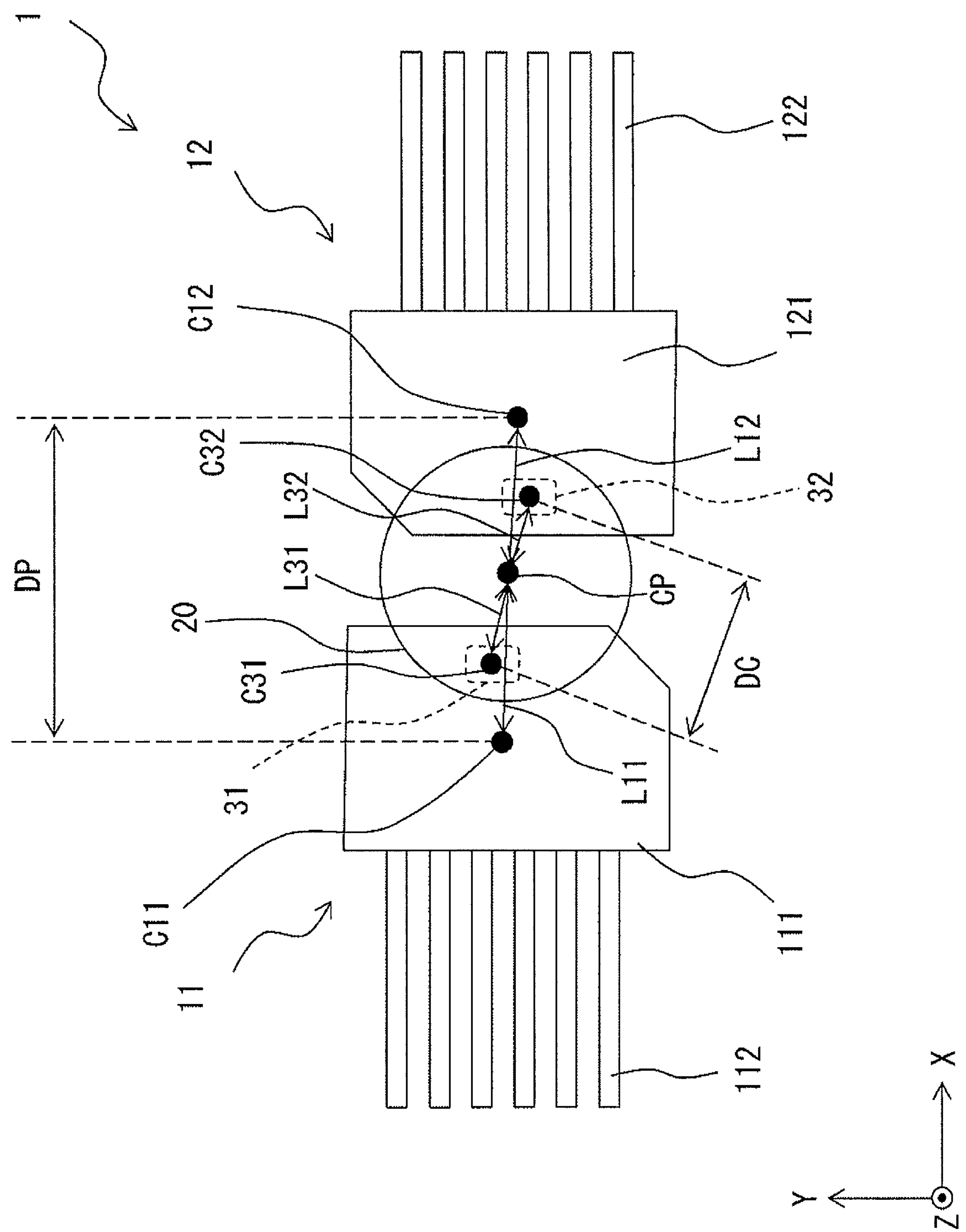
FIG. 1B is a plan view of an outline configuration example of the sensor system illustrated in FIG. 1A.

FIG. 1A is a schematic perspective view of an outline configuration example of an appearance of a sensor system 1 including a sensor module 10 according to an example embodiment of the disclosure. FIG. 1B is a schematic plan view of an outline configuration example of the sensor system 1 illustrated in FIG. 1A as viewed from above.

Referring to FIGS. 1A and 1B, the sensor system 1 may include a sensor module 10, and a permanent magnet 20 disposed near the sensor module 10.

The permanent magnet 20 may be, for example, a disk-shaped ferromagnetic body having height in a Z-axis direction and extending in an X-Y plane. The permanent magnet 20 may be attached to a tip of a substantially cylindrical shaft 21 extending in the Z-axis direction. The permanent magnet 20 and the shaft 21 may be provided integrally and rotationally in a rotational direction R20 around a rotational axis J extending in the Z-axis direction. As illustrated in FIG. 1A, the permanent magnet 20 may include an N-pole part 20N and an S-pole part 20S alternately in the rotational direction R20. FIG. 1A exemplifies a case where one of two halved portions of the entire permanent magnet 20 corresponds to the N-pole part 20N and the other of the two halved portions thereof corresponds to the S-pole part 20S. The permanent magnet 20, however, may include a plurality of N-pole parts 20N and a plurality of S-pole parts 20S that are arranged alternately along the rotational direction R20. Rotation of such a permanent magnet 20 around the rotational axis J allows for generation, near the permanent magnet 20, of a distribution of a magnetic field where polarity varies periodically. That is, the distribution of the magnetic field corresponds to a specific but non-limiting example of a "distribution of a physical quantity" in one embodiment of the disclosure, and the permanent magnet 20 corresponds to a specific but non-limiting example of a "physical quantity distribution generation source" in one embodiment of the disclosure.

The sensor module 10 includes two sensor packages 11 and 12 that each detect the distribution of the magnetic field generated near the permanent magnet 20 in association with the rotation of the permanent magnet 20. The sensor package 11 and the sensor package 12 may be arranged apart from and face each other in an X-axis direction across a central position CP of the distribution of the magnetic field in the X-Y plane orthogonal to the rotational axis J. The central position CP may be located on an extension of the rotational axis J. The sensor packages 11 and 12 each correspond to a specific but non-limiting example of a "sensor package" in one embodiment of the disclosure.

The sensor package 11 and the sensor package 12 may have substantially the same configuration. In other words, components, arrangement thereof, entire shape, and size of the sensor package 11 may be substantially the same as those of the sensor package 12. In a specific but non-limiting example, the sensor package 11 may include a mold part 111 and a lead 112. The lead 112 may be led out from an end surface of the mold part 111, and may extend in a negative (−) X-direction. The sensor package 12 may include a mold part 121 and a lead 122. The lead 122 may be led out from an end surface of the mold part 121, and may extend in a positive (+) X-direction. The mold part 111 may have a pentagonal shape, for example, in the X-Y plane, and may include a sensor chip 31 embedded inside a mold resin such as an epoxy resin, for example. Likewise, the mold part 121 may have a pentagonal shape, for example, in the X-Y plane, and may include a sensor chip 32 embedded inside the mold resin such as the epoxy resin, for example. The sensor chips 31 and 32 may be, for example, each a magnetoresistive element having a resistance that varies depending on intensity of a magnetic field generated near the permanent magnet 20.

In the X-Y plane, a chip center-to-center distance DC is shorter than a package center-to-center distance DP. The chip center-to-center distance DC is a distance from a central position C31 of the sensor chip 31 to a central position C32 of the sensor chip 32. The package center-to-center distance DP is a distance from a central position C11 of the sensor package 11 to a central position C12 of the sensor package 12. Accordingly, in the present example embodiment, a distance L31 from the central position C31 of the sensor chip 31 to the central position CP of the distribution of the magnetic field is shorter than a distance L11 from the central position C11 of the sensor package 11 to the central position CP of the distribution of the magnetic field. In other words, the central position C31 of the sensor chip 31 is shifted in a direction from the central position C11 of the sensor package 11 toward the central position CP of the distribution of the magnetic field. Likewise, in the X-Y plane, a distance L32 from the central position C32 of the sensor chip 32 to the central position CP of the distribution of the magnetic field is shorter than a distance L12 from the central position C12 of the sensor package 12 to the central position CP of the distribution of the magnetic field. In other words, the central position C32 of the sensor chip 32 is shifted in a direction from the central position C12 of the sensor package 12 toward the central position CP of the distribution of the magnetic field.

It is to be noted that the central position C11 of the sensor package 11 refers to a geometric centroid of the mold part 111 in the X-Y plane, and the central position C12 of the sensor package 12 refers to a geometric centroid of the mold part 121 in the X-Y plan. Further, the central position C31 of the sensor chip 31 refers to a geometric centroid of the sensor chip 31 in the X-Y plane, and the central position C32 of the sensor chip 32 refers to a geometric centroid of the sensor chip 32 in the X-Y plane.

Moreover, in an example embodiment, in the X-Y plane, the distance L31 from the central position CP of the distribution of the magnetic field to the central position C31 of the sensor chip 31 of the sensor package 11 is substantially equal to the distance L32 from the central position CP of the distribution of the magnetic field to the central position C32 of the sensor chip 32 of the sensor package 12, as illustrated in FIG. 1B. For example, the sensor chip 31 of the sensor package 11 and the sensor chip 32 of the sensor package 12 may be arranged at positions that are substantially rotationally symmetric to each other about the central position CP of the distribution of the magnetic field as a symmetric point. One reason for this is to avoid dispersion, due to a difference in arrangement positions, between a value of magnetic field intensity to be detected by the sensor chip 31 and a value of magnetic field intensity to be detected by the sensor chip 32.

1.2 Method of Mounting Sensor System 1

Description is given next of an example of a method of mounting the sensor system 1 with reference to FIGS. 1A and 1B.

In the method of mounting the sensor system 1, the permanent magnet 20 and the sensor packages 11 and 12 are first prepared. The permanent magnet 20 corresponds to the physical quantity distribution generation source configured to generate the distribution of the magnetic field as a physical quantity. The sensor packages 11 and 12 respectively include the sensor chips 31 and 32 configured to detect the distribution of the magnetic field.

Next, the sensor packages 11 and 12 may be arranged at predetermined positions apart from the permanent magnet 20. At this occasion, in the X-Y plane including the sensor packages 11 and 12, the chip center-to-center distance DC between the central positions C31 and C32 of the respective sensor chips 31 and 32 is set shorter than the package center-to-center distance DP between the central positions C11 and C12 of the respective sensor packages 11 and 12. In a specific but non-limiting example, in the X-Y plane, the central position C31 of the sensor chip 31 is shifted in a direction from the central position C11 of the sensor package 11 toward the central position CP of the distribution of the magnetic field. Likewise, in the X-Y plane, the central position C32 of the sensor chip 32 is shifted in a direction from the central position C12 of the sensor package 12 toward the central position CP of the distribution of the magnetic field.

Moreover, in an example embodiment, in the X-Y plane, the distance L31 from the central position CP of the distribution of the magnetic field to the central position C31 of the sensor chip 31 of the sensor package 11 is set substantially equal to the distance L32 from the central position CP of the distribution of the magnetic field to the central position C32 of the sensor chip 32 of the sensor package 12, as illustrated in FIG. 1B. For example, the sensor chip 31 of the sensor package 11 and the sensor chip 32 of the sensor package 12 may be arranged at positions that are substantially rotationally symmetric to each other about the central position CP of the distribution of the magnetic field as a symmetric point. One reason for this is to avoid dispersion, due to a difference in arrangement positions, between a value of the magnetic field intensity to be detected by the sensor chip 31 and a value of the magnetic field intensity to be detected by the sensor chip 32.

1.3 Workings and Example Effects of Sensor System 1

As described above, in a sensor system to be mounted on a vehicle, for example, multiplexed sensor chips are demanded in order to achieve continuity of functions of the overall sensor system and safety of functions thereof at a high level, in addition to detection of failure. In order to achieve the multiplexed sensor chips, a plurality of sensor chips are mounted on one sensor system. For example, in a magnetic sensor system that detects rotation of a permanent magnet, the plurality of sensor chips may be desirably disposed at a sweet spot, that is, a region where a magnetic field of sufficiently high intensity is obtained, out of the distribution of the magnetic field formed by the permanent magnet. In particular, central positions of the respective sensor chips may be arranged as close as possible to the central position of the distribution of the magnetic field formed by the permanent magnet. In addition, dispersion in distances from the central positions of the respective sensor chips to the central position of the distribution of the magnetic field formed by the permanent magnet may be as small as possible. One reason for this is that such an arrangement enhances accuracy in detecting the magnetic field by each of the sensor chips. Dispersion in magnitudes of the magnetic field that reaches the respective sensor chips may be desirably as small as possible, in order to further reduce dispersion in detected values between the respective sensor chips. Accordingly, in such a magnetic sensor system, a plurality of sensor chips may be preferably disposed in a narrower region.

Figure 5A:
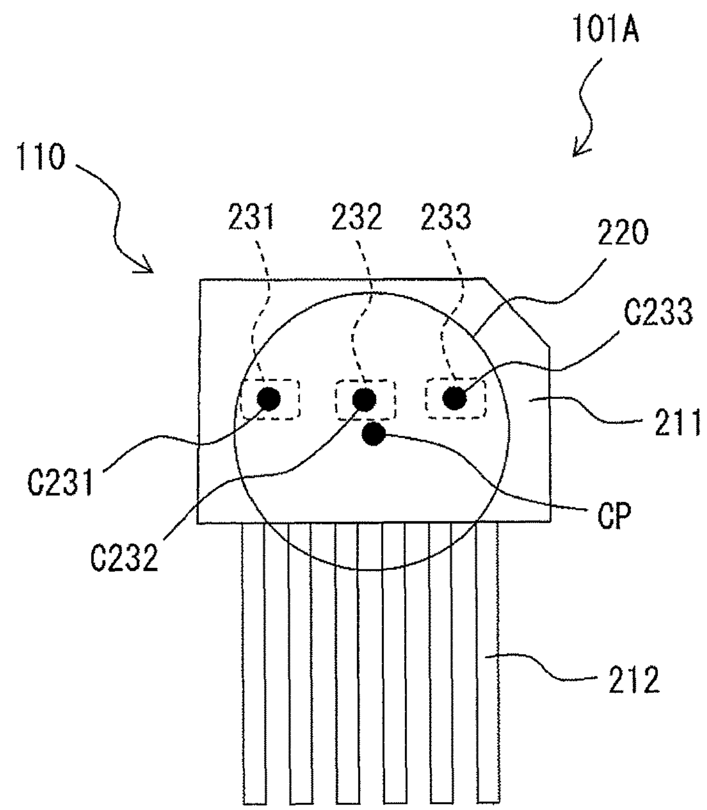
FIG. 5A is a plan view of an outline configuration example of a sensor system according to a first reference example.

Hence, it is conceivable to provide a plurality of sensor chips in one sensor package, for example, as in a sensor system 101 according to a first reference example illustrated in FIG. 5A. In the sensor system 101A, one sensor package 110 including a mold part 211 and a lead 212 is disposed near a permanent magnet 220. The mold part 211 includes three sensor chips 231 to 233 that are embedded therein. In the sensor system 101A, all of central positions C231 to C233 of the respective three sensor chips 231 to 233 are easily placed within a sweet spot of the distribution of the magnetic field, around the central position CP, formed by the permanent magnet 220.

In the sensor system 101A in such an example where the plurality of sensor chips 231 to 233 are contained inside the same sensor package 110, it is possible to use the sweet spot of the permanent magnet 220 effectively. However, because the plurality of sensor chips 231 to 233 share the same sensor package 110, the sensor chips 231 to 233 result in sharing a failure factor derived from a common member such as a mold resin or a die pad as a material that configures the mold part 211. Accordingly, in a case where, for example, one line out of respective three lines including the sensor chips 231 to 233 are burnt and damaged or are subjected to excessive static discharge, sensor chips that are not damaged may be possibly influenced by factors such as heat and a high electric field, leading to loss of the significance of the multiplexed sensor chips.

Figure 5B:
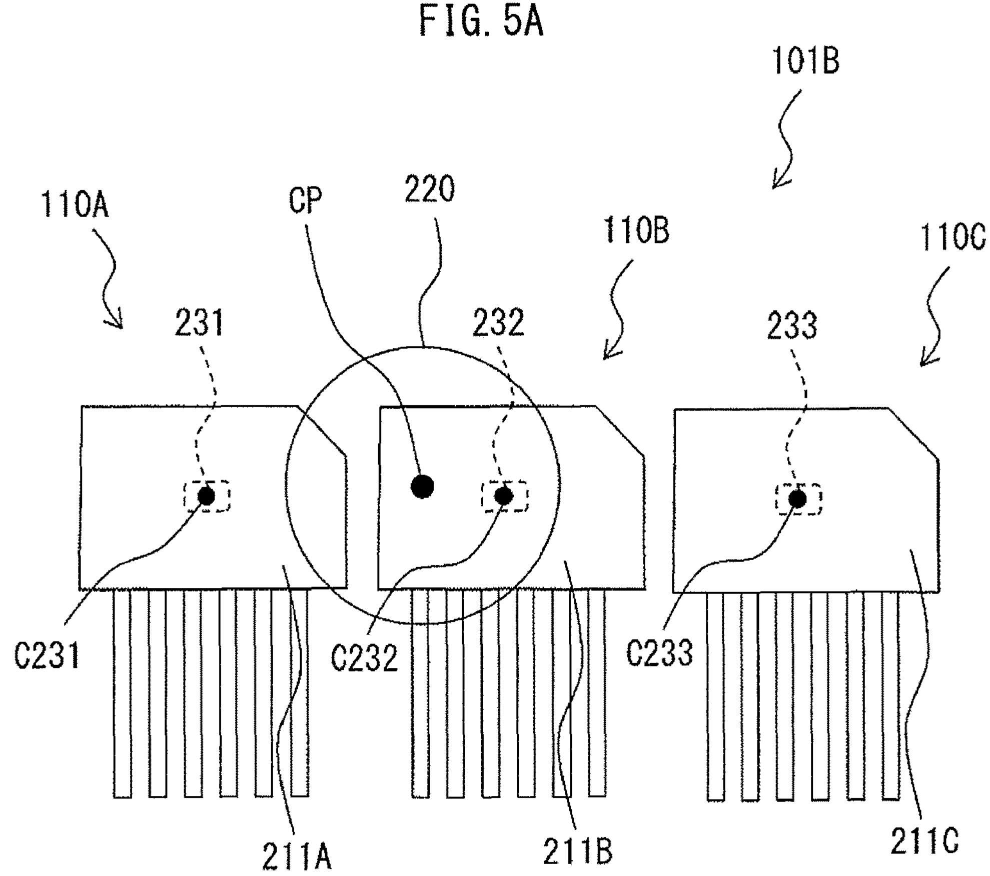
FIG. 5B is a plan view of an outline configuration example of a sensor system according to a second reference example.

Hence, it is conceivable to arrange a plurality of sensor packages each including one sensor chip near the permanent magnet 220, for example, as in a sensor system 101B according to a second reference example illustrated in FIG. 5B. In the sensor system 101B, sensor packages 110A to 110C respectively including the sensor chips 231 to 233 embedded therein are disposed in line near the permanent magnet 220. In the sensor system 101B, it is difficult to place all of the central positions C231 to C233 of the respective sensor chips 231 to 233 within the sweet spot of the distribution of the magnetic field, around the central position CP, formed by the permanent magnet 220. One reason for this is that the central positions C231 to C233 of the respective sensor chips 231 to 233 are provided at positions substantially coincident with respective central positions of mold parts 211A to 211C.

In contrast, in the sensor system 1 and the method of mounting the sensor system 1 according to the present example embodiment, in the X-Y plane including the sensor packages 11 and 12, the chip center-to-center distance DC between the central positions C31 and C32 of the respective sensor chips 31 and 32 is shorter than the package center-to-center distance DP between the central positions C11 and C12 of the respective sensor packages 11 and 12. The central positions C31 and C32 of the respective sensor chips 31 and 32 are shifted in directions, respectively, from the central positions C11 and C12 of the respective sensor packages 11 and 12 toward the central position CP of the distribution of the magnetic field. Hence, it is possible to dispose the central positions C31 and C32 of the respective sensor chips 31 and 32 within a narrower region of the distribution of the magnetic field.

Further, in the sensor system 1 of the present example embodiment, the distance L31 from the central position CP of the distribution of the magnetic field to the central position C31 of the sensor chip 31 is substantially equal to the distance L32 from the central position CP of the distribution of the magnetic field to the central position C32 of the sensor chip 32. Hence, it is possible to reduce dispersion in numerical values of the magnetic field intensity to be detected by the respective sensor chips 31 and 32.

Furthermore, in the sensor system 1 of the present example embodiment, the sensor package 11 and the sensor package 12 may be disposed apart from each other. This eliminates a common failure factor. That is, even in a case where the sensor package 11, for example, of the sensor package 11 and the sensor package 12, is subjected to excessive heat or excessive static discharge to cause the sensor chip 31 to be damaged, it is possible to reduce a possibility that the sensor chip 32 of the sensor package 12, i.e., the other sensor package may be influenced by factors such as heat and a high electric field. In other words, the multiplexed sensor chips 31 and 32 make it possible to achieve continuity of functions of the overall sensor system 1 and safety of functions thereof at a high level.

Moreover, in the sensor system 1 of the present example embodiment, the sensor chip 31 of the sensor package 11 and the sensor chip 32 of the sensor package 12 may be arranged at positions that are substantially rotationally symmetric to each other about the central position CP as a symmetric point. Thus, it is possible to avoid dispersion, due to a difference in arrangement positions, between a value of the magnetic field intensity to be detected by the sensor chip 31 and a value of the magnetic field intensity to be detected by the sensor chip 32. Hence, it is possible to obtain high accuracy in detecting the magnetic field intensity in the sensor system 1.

As described, the sensor system 1, the sensor module 10, and the method of mounting the sensor system 1 according to the present example embodiment each make it possible to exhibit more superior detection accuracy despite small size.

2. Modification Examples

Some example embodiments of the disclosure has been described hereinabove. However, the disclosure is not limited to such example embodiments, and may be modified in a variety of ways.

The description has been given, for example, referring to specific configuration examples (such as shape, arrangement, and number) of the respective components of the sensor system 1. However, the configuration examples of the respective components are not limited to those described in the foregoing example embodiments; any other shape, any other arrangement, and any other number, for example, may be adopted.

2.1 First Modification Example

Figure 2:
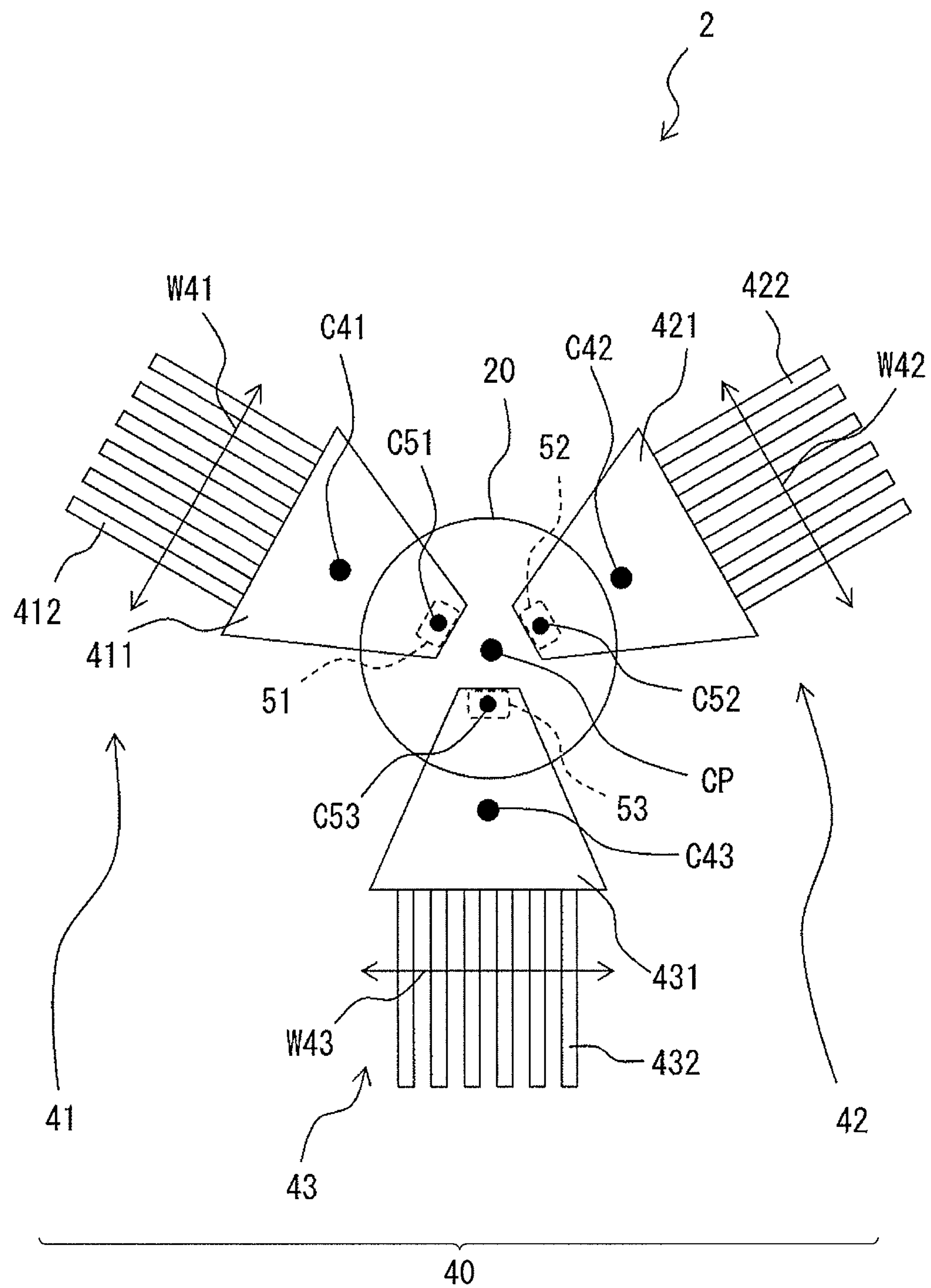
FIG. 2 is a plan view of an outline configuration example of a sensor system according to a first modification example.

FIG. 2 is a plan view of an outline configuration example of a sensor system 2 according to a first modification example of the disclosure. The sensor system 2 may include a sensor module 40 that includes three sensor packages 41 to 43 disposed near the permanent magnet 20. The sensor package 41 may include a mold part 411, and a plurality of leads 412 each extending from an end surface of the mold part 411. The sensor package 42 may include a mold part 421, and a plurality of leads 422 each extending from an end surface of the mold part 421. The sensor package 43 may include a mold part 431, and a plurality of leads 432 each extending from an end surface of the mold part 431. Further, the mold part 411 of the sensor package 41 may include a sensor chip 51 embedded therein. The mold part 421 of the sensor package 42 may include a sensor chip 52 embedded therein. The mold part 431 of the sensor package 43 may include a sensor chip 53 embedded therein.

A central position C51 of the sensor chip 51 is shifted in a direction from a central position C41 of the sensor package 41 toward the central position CP of the distribution of the magnetic field. That is, a chip center-to-center distance between the central position C51 of the sensor chip 51 and a central position C52 of the sensor chip 52 is shorter than a package center-to-center distance between the central position C41 of the sensor package 41 and a central position C42 of the sensor package 42. Likewise, the central position C52 of the sensor chip 52 is shifted in a direction from the central position C42 of the sensor package 42 toward the central position CP of the distribution of the magnetic field. A central position C53 of the sensor chip 53 is shifted in a direction from a central position C43 of the sensor package 43 toward the central position CP of the distribution of the magnetic field. That is, a chip center-to-center distance between the central position C52 of the sensor chip 52 and the central position C53 of the sensor chip 53 is shorter than a package center-to-center distance between the central position C42 of the sensor package 42 and the central position C43 of the sensor package 43. Further, a chip center-to-center distance between the central position C53 of the sensor chip 53 and the central position C51 of the sensor chip 51 is shorter than a package center-to-center distance between the central position C43 of the sensor package 43 and the central position C41 of the sensor package 41.

It is to be noted that the central position C41 of the sensor package 41 refers to a geometric centroid of the mold part 411 in the X-Y plane; the central position C42 of the sensor package 42 refers to a geometric centroid of the mold part 421 in the X-Y plane; and the central position C43 of the sensor package 43 refers to a geometric centroid of the mold part 431 in the X-Y plan. Further, the central position C51 of the sensor chip 51 refers to a geometric centroid of the sensor chip 51 in the X-Y plane; the central position C52 of the sensor chip 52 refers to a geometric centroid of the sensor chip 52 in the X-Y plane; and the central position C53 of the sensor chip 53 refers to a geometric centroid of the sensor chip 53 in the X-Y plane.

The mold parts 411, 421, and 431 of the sensor packages 41 to 43 may include respective size reduction parts. In the respective size reduction parts, sizes of the respective mold parts 411, 421, and 431 in respective directions W41, W42, and W43 may be reduced toward the central position CP of the distribution of the magnetic field. The directions W41, W42, and W43 may be orthogonal to directions in which the central position CP of the distribution of the magnetic field is linked to the central positions C51, C52, and C53 of the sensor chips 51, 52, and 53, respectively. In FIG. 2, the mold parts 411, 421, and 431 may be each in a trapezoidal planar shape having a shorter base that faces the central position CP. Further, the sensor packages 41 to 43 may be arranged to allow the respective size reduction parts to be adjacent to one another. In FIG. 2, the mold parts 411, 421, and 431 may be arranged to be adjacent to one another at a substantially equal interval, i.e., at an interval of about 120° around the central position CP as a rotation center.

As described, in the sensor system 2 according to the first modification example as well, the central positions C51 to C53 of the respective sensor chips 51 to 53 are shifted in directions, respectively, from the central positions C41 to C43 of the respective sensor packages 41 to 43 toward the central position CP of the distribution of the magnetic field. Hence, it is possible to dispose the central positions C51 to C53 of the respective sensor chips 51 to 53 within a narrower region of the distribution of the magnetic field.

Further, in the sensor system 2 according to the first modification example as well, by causing respective distances from the central position CP of the distribution of the magnetic field to the central positions C51 to C53 of the sensor chips 51 to 53 to be substantially equal, it becomes possible to reduce dispersion in numerical values of the magnetic field intensity to be detected by the respective sensor chips 51 to 53.

Furthermore, in the sensor system 2 according to the first modification example as well, the sensor packages 41 to 43 may be disposed apart from one another. This eliminates a common failure factor. That is, even in a case where one or two of the sensor packages 41 to 43 are failed under the influence of factors such as heat and a high electric field, it is possible to reduce a possibility that a sensor chip of any other normal sensor package may be influenced by the factors such as heat and a high electric field. In other words, the multiplexed sensor chips 51 to 53 make it possible to achieve continuity of functions of the overall sensor system 2 and safety of functions thereof at a high level.

Moreover, in the sensor system 2 according to the first modification example as well, the sensor chips 51 to 53 of the respective sensor packages 41 to 43 may be arranged at positions that are substantially rotationally symmetric to one another about the central position CP as a symmetric point. Thus, it is possible to avoid dispersion, due to a difference in arrangement positions, among values of the magnetic field intensity to be detected by the respective sensor chips 51 to 53. Hence, it is possible to obtain high accuracy in detecting the magnetic field intensity in the sensor system 2.

In addition, in the sensor system 2 according to the first modification example, the mold parts 411, 421, and 431 may each have a trapezoidal planar shape in the X-Y plane. The sizes of the respective mold parts 411, 421, and 431 in respective directions W41, W42, and W43 may be reduced toward the central position CP of the distribution of the magnetic field. Thus, it is possible to arrange the sensor packages 41 to 43 closer to one another, and thus to arrange the central positions C51 to C53 of the respective sensor chips 51 to 53 within a yet narrower region near the central position CP of the distribution of the magnetic field.

As described, according to the sensor system 2 and the sensor module 40 of the first modification example, it is possible to exhibit more superior detection accuracy despite small size.

2.2 Second Modification Example

Figure 3:
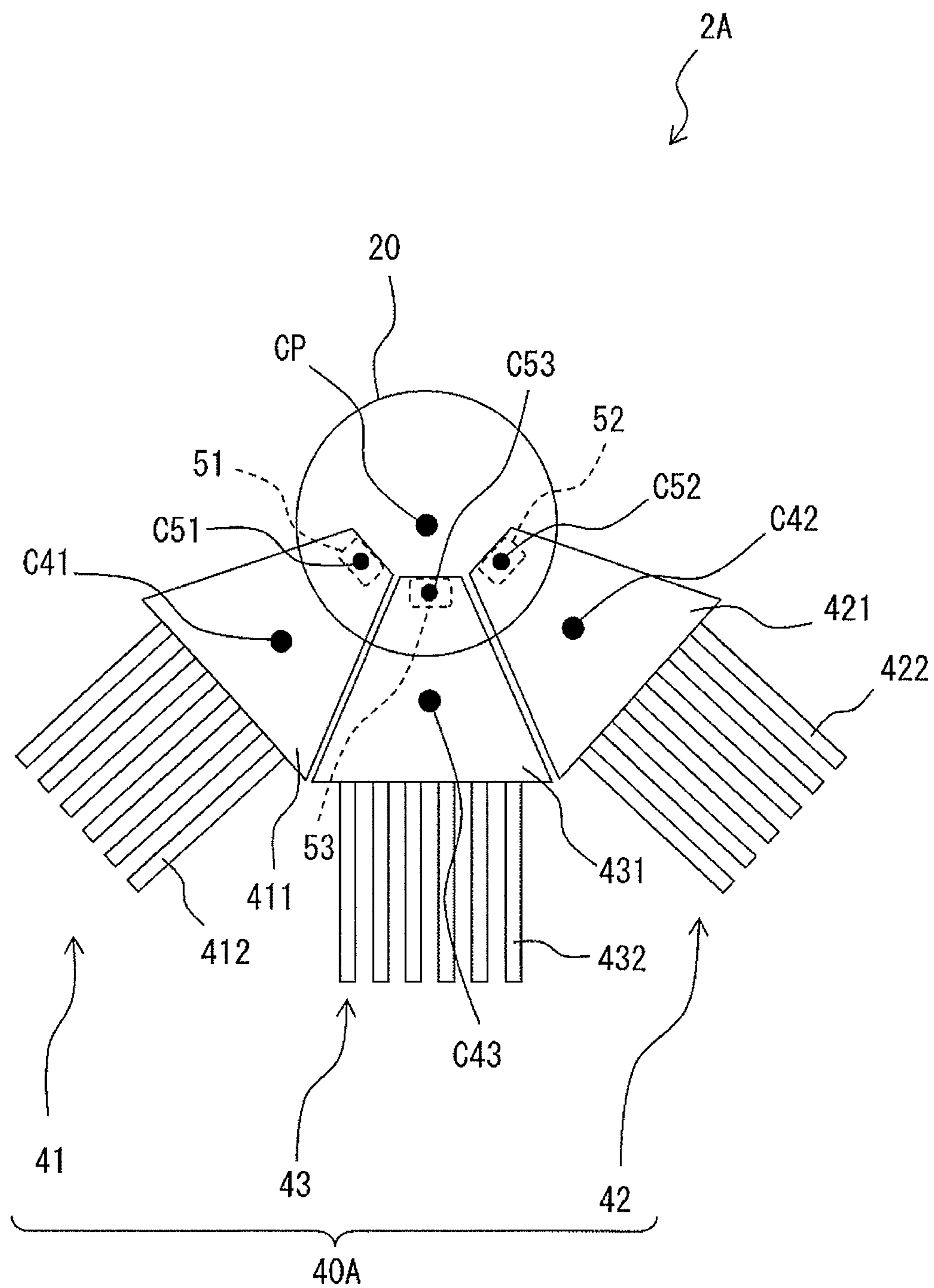
FIG. 3 is a plan view of an outline configuration example of a sensor system according to a second modification example.

FIG. 3 is a plan view of an outline configuration example of a sensor system 2A according to a second modification example of the disclosure. The sensor system 2A may include a sensor module 40A that includes the three sensor packages 41 to 43 disposed near the permanent magnet 20. In the sensor module 40A of the sensor system 2A, the sensor packages 41 to 43 may not be arranged evenly around the central position CP of the distribution of the magnetic field; the sensor packages 41 to 43 may be arranged closer to one another. Besides the above-described differences, the sensor system 2A has substantially the same configuration as that of the sensor system 2.

According to the sensor system 2A, it is possible to place the sensor packages 41 to 43 within a narrower region as compared with the sensor system 2.

2.3 Third Modification Example

Figure 4:
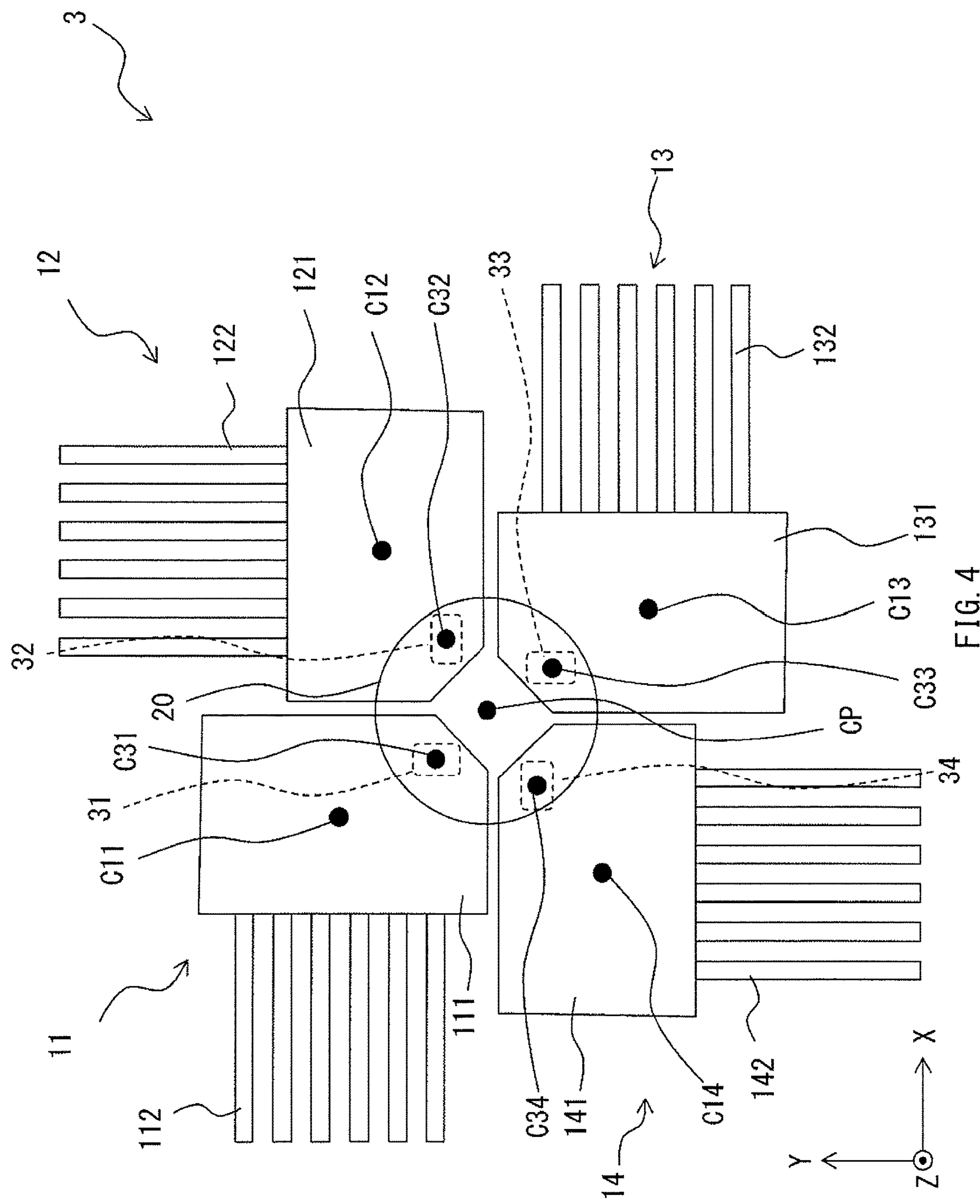
FIG. 4 is a plan view of an outline configuration example of a sensor system according to a third modification example.

FIG. 4 is a plan view of an outline configuration example of a sensor system 3 according to a third modification example of the disclosure. The sensor system 3 may include four sensor packages 11 to 14 disposed near the permanent magnet 20. In the sensor system 3, the four sensor packages 11 to 14 may be arranged evenly at an interval of 90° around the central position CP of the distribution of the magnetic field. Besides the above-described differences, the sensor system 3 has substantially the same configuration as that of the sensor system 1.

In the sensor system 3 according to the third modification example, the sensor packages 11 to 14 may include mold parts 111, 121, 131, and 141, respectively, and a plurality of leads 112, 122, 132, and 142, respectively. The plurality of leads 112, 122, 132, and 142 may extend from respective end surfaces of the mold parts 111, 121, 131, and 141. Further, the mold parts 111, 121, 131, and 141 may include, respectively, sensor chips 31, 32, 33, and 34 that are embedded therein. In the sensor system 3 as well, central positions C31 to C34 of the respective sensor chips 31 to 34 are shifted in directions, respectively, from central positions C11 to C14 of the respective sensor packages 11 to 14 toward the central position CP of the distribution of the magnetic field. Hence, it is possible to dispose the central positions C31 to C34 of the respective sensor chips 31 to 34 within a narrower region of the distribution of the magnetic field.

The description has been given in the foregoing example embodiment and modification examples by exemplifying, as a physical quantity distribution, the distribution of the magnetic field generated by rotation of the permanent magnet, and by exemplifying, as a sensor chip, the magnetoresistive element having a resistance that varies depending on the intensity of a magnetic field generated near the permanent magnet. However, embodiments of the disclosure is not limited thereto. For example, a Hall element may also be used insofar as the Hall element detects a magnetic field as a physical quantity. Further, a sensor chip that detects factors other than the magnetic field as the physical quantity may also be used. Specific but non-limiting examples of the factors other than the magnetic field may include heat, humidity, distortion, and gas. Specific but non-limiting examples of the sensor chip may include sensor chips of a temperature sensor, a humidity sensor, a piezoelectric sensor, and an oxygen sensor.

It is to be noted that the effects described herein are merely exemplary and not limitative, and may include other effects.

Moreover, the disclosure encompasses any possible combination of some or all of the various embodiments and the modification examples described herein and incorporated herein.

It is possible to achieve at least the following configurations from the above-described example embodiments of the disclosure.

(1)

A sensor system including:

a physical quantity distribution generation source configured to generate a distribution of a physical quantity; and a plurality of sensor packages including respective sensor chips configured to detect the physical quantity, central positions of the respective sensor chips being shifted in directions from central positions of the respective sensor packages toward a central position of the distribution of the physical quantity in a plane including the sensor packages, and distances from the central position of the distribution of the physical quantity to the central positions of the respective sensor chips of the respective sensor packages being substantially equal to each other in the plane including the sensor packages.

(2)

A sensor system including:

a physical quantity distribution generation source configured to generate a distribution of a physical quantity; and a plurality of sensor packages including respective sensor chips configured to detect the physical quantity, a chip center-to-center distance between central positions of the respective sensor chips being shorter than a package center-to-center distance between central positions of the respective sensor packages in a plane including the sensor packages, and distances from a central position of the distribution of the physical quantity to the central positions of the respective sensor chips being substantially equal to each other in the plane including the sensor packages.

(3)

The sensor system according to (1) or (2), in which the sensor chips of the respective sensor packages are disposed at positions that are substantially rotationally symmetric to each other.

(4)

The sensor system according to any one of (1) to (3), in which the sensor packages include respective size reduction parts, the size reduction parts having sizes in directions that are orthogonal to respective directions in which the central position of the distribution of the physical quantity is linked to the respective central positions of the sensor chips, the sizes each being reduced toward the central position of the distribution of the physical quantity.

(5)

The sensor system according to (4), in which the sensor packages are disposed to allow the respective size reduction parts to be adjacent to each other.

(6)

The sensor system according to any one of (1) to (5), in which the sensor packages are disposed apart from each other.

(7)

A sensor module including:

a first sensor package including a first sensor chip configured to detect a physical quantity; and a second sensor package including a second sensor chip configured to detect the physical quantity, a central position of the first sensor chip being shifted in a direction from a central position of the first sensor package toward a central position of a distribution of the physical quantity, and a central position of the second sensor chip being shifted in a direction from a central position of the second sensor package toward the central position of the distribution of the physical quantity, in a plane including the first sensor package and the second sensor package, and a distance from the central position of the distribution of the physical quantity to the central position of the first sensor chip and a distance from the central position of the distribution of the physical quantity to the central position of the second sensor chip being substantially equal to each other in the plane including the first sensor package and the second sensor package.

(8)

A sensor module including:

a first sensor package including a first sensor chip configured to detect a physical quantity; and a second sensor package including a second sensor chip configured to detect the physical quantity, a chip center-to-center distance between a central position of the first sensor chip and a central position of the second sensor chip being shorter than a package center-to-center distance between a central position of the first sensor package and a central position of the second sensor package in a plane including the first sensor package and the second sensor package, and a distance from a central position of a distribution of the physical quantity to the central position of the first sensor chip and a distance from the central position of the distribution of the physical quantity to the central position of the second sensor chip being substantially equal to each other in the plane including the first sensor package and the second sensor package.

(9)

A method of mounting a sensor system, the method including:

preparing a physical quantity distribution generation source configured to generate a distribution of a physical quantity and a plurality of sensor packages including respective sensor chips configured to detect the physical quantity; and disposing the sensor packages with respect to the physical quantity distribution generation source, the disposing of the sensor packages including shifting central positions of the respective sensor chips in directions from central positions of the respective sensor packages toward a central position of the distribution of the physical quantity in a plane including the sensor packages, and causing distances from the central position of the distribution of the physical quantity to the central positions of the respective sensor chips of the respective sensor packages to be substantially equal to each other in the plane including the sensor packages.

(10)

A method of mounting a sensor system, the method including:

preparing a physical quantity distribution generation source configured to generate a distribution of a physical quantity and a plurality of sensor packages including respective sensor chips configured to detect the physical quantity; and disposing the sensor packages with respect to the physical quantity distribution generation source, the disposing of the sensor packages including causing a chip center-to-center distance between central positions of the respective sensor chips to be shorter than a package center-to-center distance between central positions of the respective sensor packages in a plane including the sensor packages, and causing distances from the central position of the distribution of the physical quantity to the central positions of the respective sensor chips to be substantially equal to each other in the plane including the sensor packages.

In the sensor system according to one example embodiment of the disclosure, the central positions of the respective sensor chips are shifted in directions from central positions of the respective sensor packages toward the central position of the distribution of the physical quantity in the plane including the sensor packages, thus making it possible to dispose the central positions of the respective sensor chips within a narrower region of the distribution of the physical quantity. Further, in the sensor system according to one example embodiment of the disclosure, distances from the central position of the distribution of the physical quantity to the central positions of the respective sensor chips are substantially equal to each other, thus making it possible to reduce dispersion in numerical values of the physical quantity to be detected by the respective sensor chips.

In the sensor system according to one example embodiment of the disclosure, the chip center-to-center distance between the central positions of the respective sensor chips is shorter than the package center-to-center distance between the central positions of the respective sensor packages in the plane including the sensor packages, thus making it possible to dispose the central positions of the respective sensor chips within a narrower region of the distribution of the physical quantity. Further, in the sensor system according to one example embodiment of the disclosure, distances from the central position of the distribution of the physical quantity to the central positions of the respective sensor chips are substantially equal to each other in the plane including the sensor packages, thus making it possible to reduce dispersion in numerical values of the physical quantity to be detected by the respective sensor chips.

In the sensor module according to one example embodiment of the disclosure, the central position of the first sensor chip is shifted in a direction from the central position of the first sensor package toward the central position of the distribution of the physical quantity, and the central position of the second sensor chip is shifted in a direction from the central position of the second sensor package toward the central position of the distribution of the physical quantity, in the plane including the first sensor package and the second sensor package. Thus, it is possible to dispose the central position of the first sensor chip and the central position of the second sensor chip within a narrower region of the distribution of the physical quantity. Further, in the sensor module according to one example embodiment of the disclosure, a distance from the central position of the distribution of the physical quantity to the central position of the first sensor chip and a distance from the central position of the distribution of the physical quantity to the central position of the second sensor chip are substantially equal to each other, thus making it possible to reduce a difference between a numerical value of the physical quantity to be detected by the first sensor chip and a numerical value of the physical quantity to be detected by the second sensor chip.

In the sensor module according to one example embodiment of the disclosure, the chip center-to-center distance between the central position of the first sensor chip and the central position of the second sensor chip is shorter than the package center-to-center distance between the central position of the first sensor package and the central position of the second sensor package in the plane including the first sensor package and the second sensor package, thus making it possible to dispose the central position of the first sensor chip and the central position of the second sensor chip within a narrower region of the distribution of the physical quantity. Further, in the sensor module according to one example embodiment of the disclosure, a distance from the central position of the distribution of the physical quantity to the central position of the first sensor chip and a distance from the central position of the distribution of the physical quantity to the central position of the second sensor chip are substantially equal to each other in the plane including the first sensor package and the second sensor package, thus making it possible to reduce a difference between a numerical value of the physical quantity to be detected by the first sensor chip and a numerical value of the physical quantity to be detected by the second sensor chip.

In the method of mounting the sensor system according to one embodiment of the disclosure, the central positions of the respective sensor chips are shifted in directions from the central positions of the respective sensor packages toward the central position of the distribution of the physical quantity in the plane including the sensor packages, thus making it possible to dispose the central positions of the respective sensor chips within a narrower region of the distribution of the physical quantity. Further, in the method of mounting the sensor system according to one embodiment of the disclosure, the distances from the central position of the distribution of the physical quantity to the central positions of the respective sensor chips of the respective sensor packages are set substantially equal to each other, thus making it possible to reduce dispersion in numerical values of the physical quantity to be detected by the respective sensor chips.

In the method of mounting the sensor system according to one embodiment of the disclosure, the chip center-to-center distance between the central positions of the respective sensor chips is set shorter than the package center-to-center distance between the central positions of the respective sensor packages in the plane including the sensor packages, thus making it possible to dispose the central positions of the respective sensor chips within a narrower region of the distribution of the physical quantity. Further, in the method of mounting the sensor system according to one embodiment of the disclosure, the distances from the central position of the distribution of the physical quantity to the central positions of the respective sensor chips are set substantially equal to each other in the plane including the sensor packages, thus making it possible to reduce dispersion in numerical values of the physical quantity to be detected by the respective sensor chips.

According to the sensor system, the sensor module, and the method of mounting the sensor system of the respective example embodiments of the disclosure, it is possible to exhibit more superior detection accuracy despite small size.

Although the disclosure has been described in terms of exemplary embodiments, it is not limited thereto. It should be appreciated that variations may be made in the described embodiments by persons skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. For example, in this disclosure, the term “preferably”, “preferred” or the like is non-exclusive and means “preferably”, but not limited to. The use of the terms first, second, etc. do not denote any order or importance, but rather the terms first, second, etc. are used to distinguish one element from another. The term “substantially” and its variations are defined as being largely but not necessarily wholly what is specified as understood by one of ordinary skill in the art. The term “about” as used herein can allow for a degree of variability in a value or range. Moreover, no element or component in this disclosure is intended to be dedicated to the public regardless of whether the element or component is explicitly recited in the following claims.

What is claimed is:

1. A sensor system comprising:

a physical quantity distribution generation source configured to generate a distribution of a physical quantity; and a plurality of sensor packages including respective sensor chips configured to detect the physical quantity, central positions of the respective sensor chips being shifted in directions from central positions of the respective sensor packages toward a central position of the distribution of the physical quantity in a plane including the sensor packages, and distances from the central position of the distribution of the physical quantity to the central positions of the respective sensor chips of the respective sensor packages being substantially equal to each other in the plane including the sensor packages, wherein:

the sensor packages include respective size reduction parts, the size reduction parts having sizes in directions that are orthogonal to respective directions in which the central position of the distribution of the physical quantity is linked to the respective central positions of the sensor chips, the sizes each being reduced toward the central position of the distribution of the physical quantity, the sensor packages are disposed to allow the respective size reduction parts to be adjacent to each other, and the sensor chips are disposed on the respective size reduction parts.

2. The sensor system according to claim 1, wherein the sensor chips of the respective sensor packages are disposed at positions that are substantially rotationally symmetric to each other.

3. The sensor system according to claim 1, wherein the sensor packages are disposed apart from each other.

4. The sensor system according to claim 1, wherein each of the sensor packages is apart from each other and includes a mold part having a first end closest to the central position of the distribution of the physical quantity, and a second end opposite from the first end, and one or more leads extending from the second end of the mold part.

5. A sensor system comprising:

a physical quantity distribution generation source configured to generate a distribution of a physical quantity; and a plurality of sensor packages including respective sensor chips configured to detect the physical quantity, a chip center-to-center distance between central positions of the respective sensor chips being shorter than a package center-to-center distance between central positions of the respective sensor packages in a plane including the sensor packages, and distances from a central position of the distribution of the physical quantity to the central positions of the respective sensor chips being substantially equal to each other in the plane including the sensor packages, wherein:

the sensor packages include respective size reduction parts, the size reduction parts having sizes in directions that are orthogonal to respective directions in which the central position of the distribution of the physical quantity is linked to the respective central positions of the sensor chips, the sizes each being reduced toward the central position of the distribution of the physical quantity, the sensor packages are disposed to allow the respective size reduction parts to be adjacent to each other, and the sensor chips are disposed on the respective size reduction parts.

6. The sensor system according to claim 5, wherein the sensor chips of the respective sensor packages are disposed at positions that are substantially rotationally symmetric to each other.

7. The sensor system according to claim 5, wherein the sensor packages are disposed apart from each other.

8. The sensor system according to claim 5, wherein each of the sensor packages is apart from each other and includes a mold part having a first end closest to the central position of the distribution of the physical quantity, and a second end opposite from the first end, and one or more leads extending from the second end of the mold part.

9. A sensor module comprising:

a first sensor package including a first sensor chip configured to detect a physical quantity; and a second sensor package including a second sensor chip configured to detect the physical quantity, a central position of the first sensor chip being shifted in a direction from a central position of the first sensor package toward a central position of a distribution of the physical quantity, and a central position of the second sensor chip being shifted in a direction from a central position of the second sensor package toward the central position of the distribution of the physical quantity, in a plane including the first sensor package and the second sensor package, and a distance from the central position of the distribution of the physical quantity to the central position of the first sensor chip and a distance from the central position of the distribution of the physical quantity to the central position of the second sensor chip being substantially equal to each other in the plane including the first sensor package and the second sensor package, wherein:

the first sensor package includes a first size reduction part, the first size reduction part having a first size in direction that is orthogonal to direction in which the central position of the distribution of the physical quantity is linked to the central position of the first sensor chip, the first size being reduced toward the central position of the distribution of the physical quantity, the second sensor package includes a second size reduction part, the second size reduction part having a second size in direction that is orthogonal to direction in which the central position of the distribution of the physical quantity is linked to the central position of the second sensor chip, the second size being reduced toward the central position of the distribution of the physical quantity, the first sensor package and the second sensor package are disposed to allow the first size reduction part and the second size reduction part to be adjacent to each other, the first sensor chip is disposed on the first size reduction part, and the second sensor chip is disposed on the second size reduction part.

10. A sensor module comprising:

a first sensor package including a first sensor chip configured to detect a physical quantity; and a second sensor package including a second sensor chip configured to detect the physical quantity, a chip center-to-center distance between a central position of the first sensor chip and a central position of the second sensor chip being shorter than a package center-to-center distance between a central position of the first sensor package and a central position of the second sensor package in a plane including the first sensor package and the second sensor package, and a distance from a central position of a distribution of the physical quantity to the central position of the first sensor chip and a distance from the central position of the distribution of the physical quantity to the central position of the second sensor chip being substantially equal to each other in the plane including the first sensor package and the second sensor package, wherein:

the first sensor package includes a first size reduction part, the first size reduction part having a first size in direction that is orthogonal to direction in which the central position of the distribution of the physical quantity is linked to the central position of the first sensor chip, the first size being reduced toward the central position of the distribution of the physical quantity, the second sensor package includes a second size reduction part, the second size reduction part having a second size in direction that is orthogonal to direction in which the central position of the distribution of the physical quantity is linked to the central position of the second sensor chip, the second size being reduced toward the central position of the distribution of the physical quantity, the first sensor package and the second sensor package are disposed to allow the first size reduction part and the second size reduction part to be adjacent to each other, the first sensor chip is disposed on the first size reduction part, and the second sensor chip is disposed on the second size reduction part.

* * * * *